US007254242B2

(12) United States Patent
Ise et al.

(10) Patent No.: US 7,254,242 B2
(45) Date of Patent: Aug. 7, 2007

(54) ACOUSTIC SIGNAL PROCESSING APPARATUS AND METHOD, AND AUDIO DEVICE

(75) Inventors: Tomohiko Ise, Iwaki (JP); Nozomu Saito, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 666 days.

(21) Appl. No.: 10/453,918

(22) Filed: Jun. 3, 2003

(65) Prior Publication Data

US 2004/0037439 A1 Feb. 26, 2004

(30) Foreign Application Priority Data

Jun. 17, 2002 (JP) ............................ 2002-176326

(51) Int. Cl.
*H04B 15/00* (2006.01)

(52) U.S. Cl. .................. 381/94.3; 381/94.2; 381/94.1; 381/94.7

(58) Field of Classification Search .................. 381/98, 381/94.2, 94.3, 94.7, 94.1
See application file for complete search history.

(56) References Cited

U.S. PATENT DOCUMENTS 4,973,897 A * 11/1990 Ohsawa .................. 324/76.19
5,272,695 A 12/1993 Makino et al.
5,285,165 A 2/1994 Renfors et al.
5,625,684 A 4/1997 Matouk et al.
5,774,561 A * 6/1998 Nakagawa et al. ........... 381/66
5,970,154 A 10/1999 Chen et al.
6,377,637 B1 * 4/2002 Berdugo ..................... 375/346

FOREIGN PATENT DOCUMENTS

EP 0661903 7/1995
EP 0758830 2/1997
EP 0821513 1/1998
JP 08331020 12/1996

OTHER PUBLICATIONS

"Fast Converging Subband Acoustic Echo Cancellation Using RAP On The WE DSP 16A", Gay, S. et al., IEEE International Conference On Acoustics, Speech, And Signal Processing, Apr. 3, 1990, pp. 1141-1144, XP010641486.
"A Novel Approach for Single Microphone Active Noise Cancellation", Siravara, Bharath, et al., IEEE 45th Midwest Symposium on Circuits and Systems Conference Proceedings, Aug. 4, 2002, pp. 111-469 to 111-472, XP010635601.

* cited by examiner

*Primary Examiner*—Vivian Chin
*Assistant Examiner*—Con P. Tran
(74) *Attorney, Agent, or Firm*—Brinks Hofer Gilson & Lione

(57) ABSTRACT

A first band analyzer divides an acoustic signal received from a sound playback system through an input unit into frequency bands, and generates a first band level. An acoustic signal estimator estimates the band level of the original acoustic signal at the input unit, and generates a second band level for each band. A processor extracts an external noise component which is contained in the acoustic signal using the first band level and the second band level. The external noise can be accurately estimated with less computation than in the related art.

21 Claims, 7 Drawing Sheets

ACOUSTIC SIGNAL PROCESSING APPARATUS AND METHOD, AND AUDIO DEVICE

BACKGROUND OF THE INVENTION

1. Field of the Invention

The present invention relates to an acoustic signal processing apparatus and method, and an audio device. More particularly, the present invention relates to the art of extracting external noise components contained in acoustic signals.

2. Description of the Related Art

In general, car audio systems have problems with noise which is present in sound playback systems. The noise makes it difficult for users to hear acoustic signals of music, etc., provided from a speaker while moving. In the related art, an audio signal supplied to the speaker is corrected based on an external noise component, such as noise present in a sound playback system.

FIG. 8 shows an acoustic signal processing apparatus of the related art for extracting external noise contained in an acoustic signal. A speaker 10 provides an acoustic signal corresponding to an audio input to a sound playback system. The sound playback system has external noise. A microphone 11 converts the noisy acoustic signal into an electrical signal, and supplies it to a subtractor 12. An FIR (Finite Impulse Response) digital filter 13 supplies a simulated impulse response of the sound playback system to the subtractor 12. The output of the FIR filter 13 corresponds to a noiseless audio signal taking the sound playback system into account, and the external noise component is provided as an output from the subtractor 12.

However, the apparatus of the related art has drawbacks. As shown in FIG. 9, the impulse response of the sound playback system in the car audio system has a length of about 4,000 sampling points given that the sampling frequency is 44.1 kHz. In other words, the FIR filter 13 must have about 4,000 taps, which makes the apparatus costly. In addition, the FIR filter 13 must perform a large number of computations, resulting in high power consumption due to heat, etc. The number of sum-of-product computations required per sampling time (1/44100 Hz≅0.023 msec) for FIR filtering by the FIR filter 13 with, for example, 4,096 taps is given by 4096×2, and the number of sum-of-product computations required per second is given by (4096×2)×44100=361,267,200.

SUMMARY OF THE INVENTION

Accordingly, in order to overcome the above-described drawbacks of the related art, it is an object of the present invention to provide an acoustic signal processing apparatus and method, and an audio device in which external noise can be accurately estimated with less computation.

In one aspect of the present invention, an acoustic signal processing apparatus includes a first band analyzer for dividing an acoustic signal received from a sound playback system through an input unit into a plurality of frequency bands and for generating a first band level for each band; an acoustic signal estimator for estimating the band level of the original acoustic signal at the input unit and for generating a second band level for each band; and a processor for extracting an external noise component which is contained in the acoustic signal using the first band level and the second band level. The acoustic signal is divided into a plurality of frequency bands and the band level is supplied for each band, thus allowing a frequency characteristic of the acoustic signal to be represented by the band level for each band, so that the amount of computation required can be greatly reduced. The apparatus can therefore be compact and low-cost. The number of bands divided is set as desired, thus achieving a compact and low-cost apparatus with high accuracy.

In the acoustic signal processing apparatus, the acoustic signal estimator may include a second band analyzer for dividing an audio signal corresponding to the acoustic signal, which has not been supplied to the sound playback system, into the plurality of frequency bands and for generating a third band level; and a calculator for correcting the third band level according to an acoustic characteristic of the sound playback system which is in the state where the sound playback system does not have the external noise component. The calculator is the model of a noiseless sound playback system. The external noise component is obtained by subtracting the second band level received from the acoustic signal estimator from the first band level. In the acoustic signal processing apparatus, the calculator may multiply the third band level by a coefficient for correction. The acoustic signal estimator may include a coefficient adjusting unit for adjusting the value of the coefficient. With adjustment of the coefficient, the apparatus can support a variety of sound playback systems.

Alternatively, the acoustic signal estimator may selectively generate a plurality of second band levels depending upon a state of the sound playback system. Therefore, a second band level suitable for the sound playback system can be easily selected, for each band, from the plurality of second band levels using a simple mechanism.

In the acoustic signal processing apparatus, the processor may subtract the second band level from the first band level. With such a simple calculation method as subtraction, a compact and low-cost acoustic signal playback apparatus with low power consumption can be achieved.

In the acoustic signal processing apparatus, the first band analyzer, the acoustic signal estimator, and the processor may be formed on a single chip.

The band level may be a mean level for each frequency band.

In another aspect of the present invention, an audio signal processing method includes: dividing an acoustic signal received from a sound playback system through an input unit into a plurality of frequency bands and generating a first band level; estimating the band level of the original acoustic signal at the input unit and generating a second band level for each band; and extracting a noise component which is contained in the acoustic signal using the first band level and the second band level. Therefore, a system for carrying out the method can be compact and low-cost. The number of bands is set as desired, thus achieving a compact and low-cost system with high accuracy.

In another aspect of the present invention, an audio device includes an audio source for generating an audio signal, and a correction unit for correcting the audio signal. The correction unit includes the above-noted acoustic signal processing apparatus, and a corrector for correcting the audio signal according to the external noise component supplied from the acoustic signal processing apparatus. Since an acoustic signal for canceling masking caused by external noise present in the environment where the audio device is installed can be provided, a problem that music is suppressed by the external noise and cannot be heard is overcome.

In the audio device, the correction unit may include a filter for performing audio correction on the audio signal according to the external noise component. The correction unit may include an audio corrector.

According to the present invention, therefore, in an acoustic signal processing apparatus and method, and an audio device, external noise can be accurately estimated with less computation.

DESCRIPTION OF THE PREFERRED EMBODIMENTS

Embodiments of the present invention are described below with reference to the accompanying drawings.

First Embodiment

Figure 1:
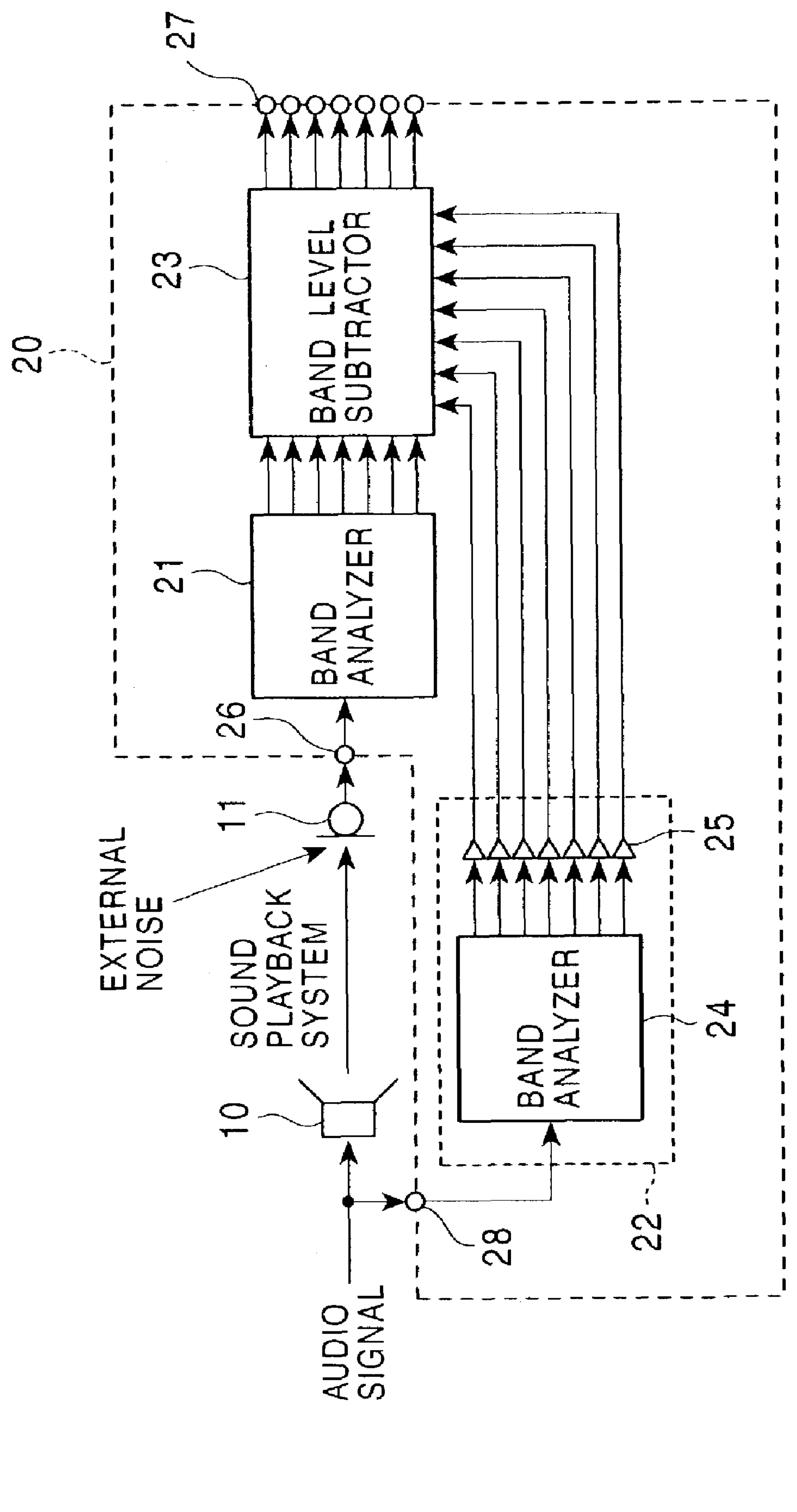
FIG. 1 is a schematic diagram illustrating an acoustic signal processing apparatus and method according to a first embodiment of the present invention.

FIG. 1 shows an acoustic signal processing apparatus and method according to a first embodiment of the present invention.

An acoustic signal processing circuit 20 includes a band analyzer 21, an acoustic signal estimator 22, and a band level subtractor 23. The acoustic signal processing circuit 20 further includes input terminals 26 and 28, and output terminals 27. A microphone 11 is connected to the input terminal 26 of the acoustic signal processing circuit 20. An audio signal is supplied to the speaker 10 and is also supplied to the input terminal 28. An electrical signal (external noise signal) corresponding to external noise extracted in the way described below is supplied to the output terminal 27 for each band.

The band analyzer 21 which functions as a first band analyzer divides the acoustic signal received from a sound playback system through the input terminal 26 serving as an input unit into frequency bands, and generates a first band level. The acoustic signal estimator 22 estimates the band level of the original acoustic signal at the input terminal 26, and generates a second band level for each band. The acoustic signal of the input terminal 26 means an output signal of a microphone 11 connected to the input terminal 26. The band level subtractor 23 which functions as a processor subtracts the second band level from the first band level to extract an external noise component contained in the acoustic signal.

The acoustic signal estimator 22 includes a band analyzer 24 and a multiplier group 25. The band analyzer 24 which functions as a second band analyzer divides the acoustic signal which has not been supplied to the sound playback system, i.e., the audio signal applied to the speaker 10 and the input terminal 28, into frequency bands, and generates a third band level. The multiplier group 25 which functions as a calculator corrects the third band level according to an acoustic characteristic of the sound playback system assuming that the sound playback system is noiseless. In this way, the acoustic signal estimator 22 shown in FIG. 1 uses the audio signal applied to the speaker 10 to estimate the band level of the original (noiseless) acoustic signal (audio signal) at the microphone 11.

The band analysis performed by the band analyzers 21 and 24 includes dividing the frequency band of the audio signal to define a plurality of bands (frequency widths), and generating the band level for each band. In this embodiment, the frequency characteristic of the acoustic signal is represented by the band level for each band. An example of the band level is the mean level for each band. The signal level at a certain frequency can be calculated by, for example, performing FFT (Fast Fourier Transform) on an input signal. The signal levels at some frequencies are determined for each band to calculate the average thereof, thereby obtaining the band level.

Each multiplier of the multiplier group 25 corresponds to one band, and multiplies the band level of the corresponding band by a predetermined coefficient. The value of the coefficient set for each band depends upon the sound playback system. The multiplier group 25 multiplies the band level received from the band analyzer 24 by the coefficient which depends upon a frequency characteristic of the pure (or noiseless) sound playback system to estimate the band level of the original acoustic signal (audio signal) at the microphone 11. The multiplier group 25 is therefore a circuit that models the sound playback system.

For each band, the band level subtractor 23 subtracts the second band level received from the acoustic signal estimator 22 from the first band level received from the band analyzer 21, and supplies the subtraction result to the output terminal 27. The resulting output signal of the acoustic signal processing apparatus 20 is an external noise signal indicating the band level of external noise estimated for each band.

Figure 2:
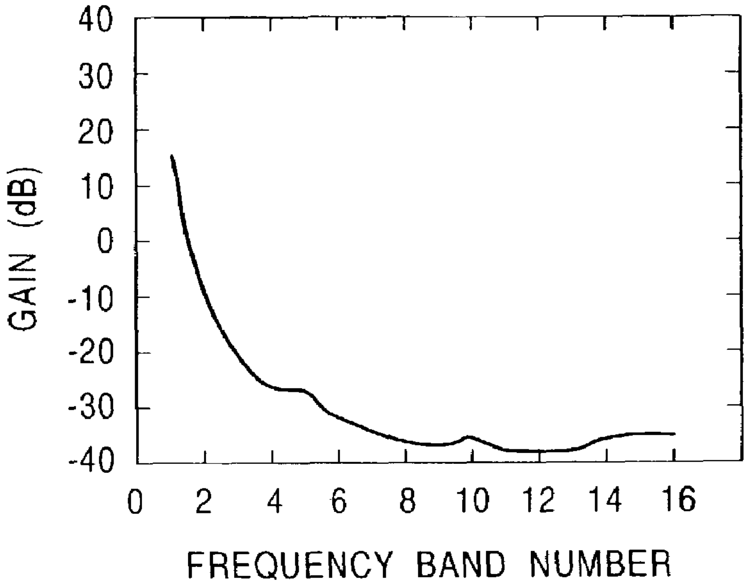
FIG. 2 is a graph showing the measured band level of a noise signal.
Figure 3:
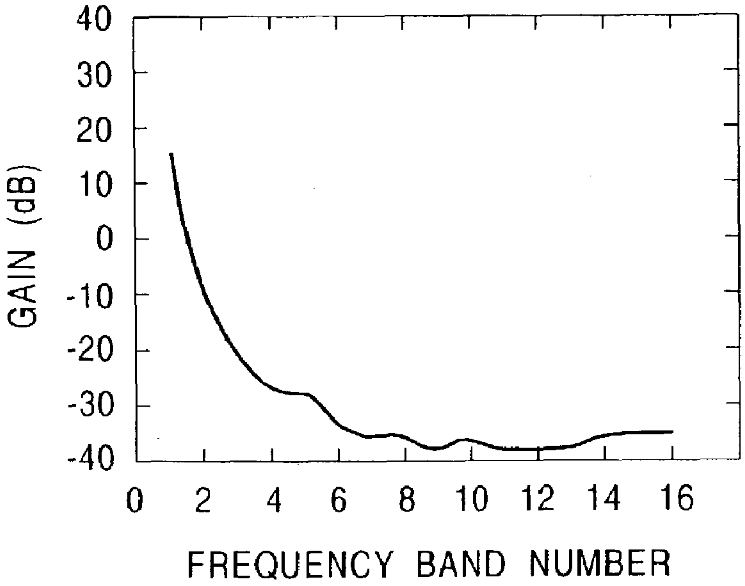
FIG. 3 is a graph showing the estimated band level generated by the acoustic signal processing apparatus shown in FIG. 1.
Figure 4:
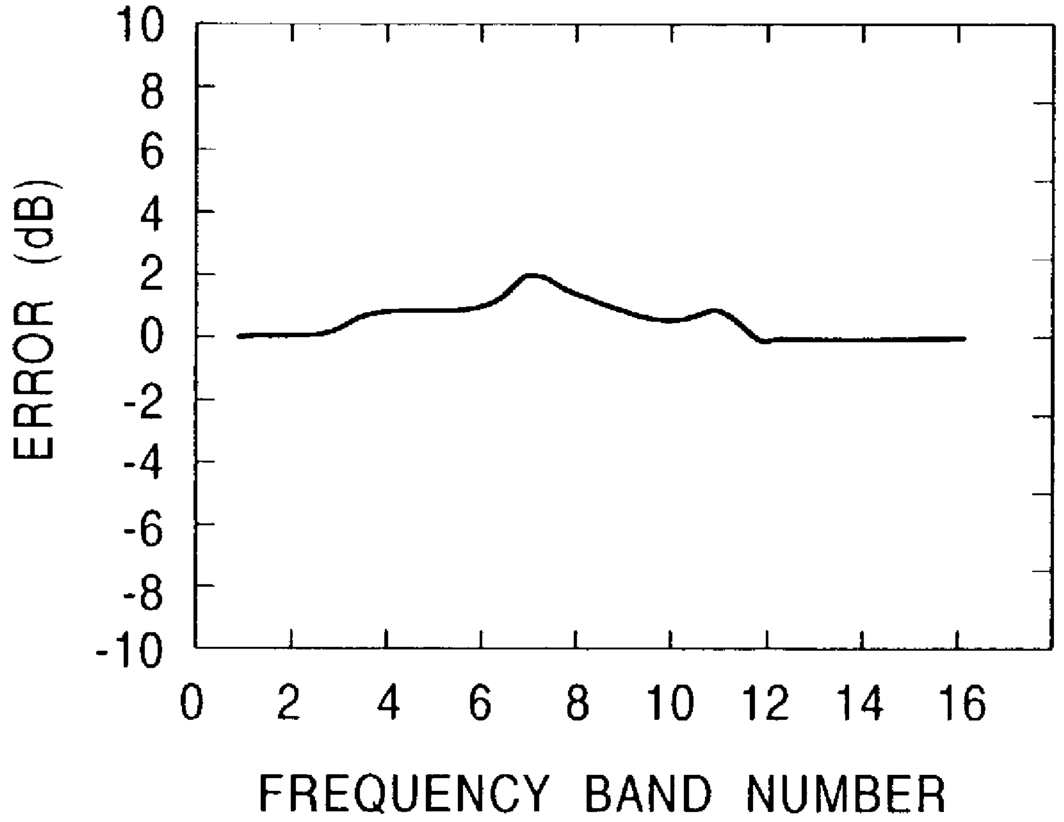
FIG. 4 is a graph illustrating the difference between the measured band level shown in FIG. 2 and the estimated band level shown in FIG. 3.

FIG. 2 is a graph showing the measured band level of the noise signal, FIG. 3 is a graph showing the estimated band level supplied to the output terminal 27 of the acoustic signal processing apparatus 20, and FIG. 4 is a graph showing the difference (error) between the measured band level and the estimated band level. In FIGS. 2 through 4, the x-axis designates the band number. In the examples shown in FIGS. 2 through 4, the audio signal is equally divided into 16 frequency bands. For example, assuming that the audio signal has a frequency bandwidth of 20 kHz, each band has a frequency bandwidth of 1250 Hz. In FIGS. 2 and 3, the y-axis designates the gain (dB). In FIG. 4, the y-axis designates the error (dB). The band level of the noise signal can be estimated with an error range of about 2 dB. Furthermore, the acoustic signal processing apparatus 20 requires much less computation than the apparatus of the related art. The number of average sum-of-product computations required per sampling time when the signal is divided into 16 frequency bands is given by the following equation:

$$[(4096/2)\times\{\log_2(4096)-1\}+4096\times\log_2(4096)+4096+16]\times2\div4096=37.0078$$

The number of computations required per second is given as follows:

$$37.0078\times44100=1632000$$

The number of computations required in the present invention is about 1/221 of the number of computations required in the related art, i.e., 361,267,200, and is greatly reduced. Therefore, external noise can be accurately estimated with fewer computations, thus making the acoustic signal processing apparatus 20 compact and low-cost with low power consumption.

The number of bands is not limited to 16, and the signal may be divided into any number of frequency bands. The more frequency bands the signal is divided into, the more precise adjustment of frequency division can be achieved while more computation is required. On the other hand, the fewer frequency bands the signal is divided into, the less precisely adjusted is frequency division although less computation is required. The number of bands should be set as desired in view of this point.

Figure 5A:
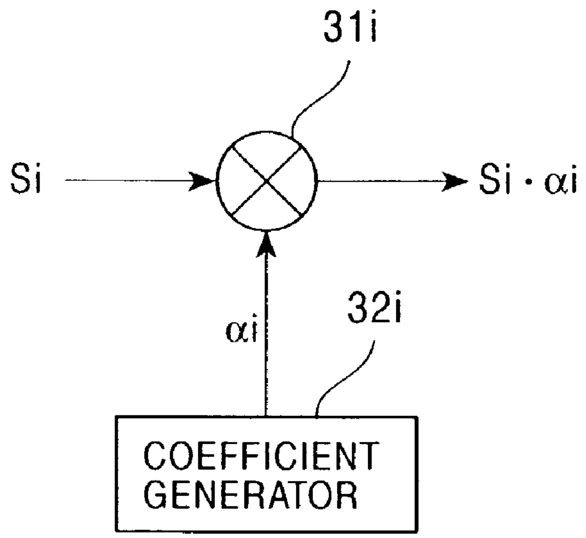
FIGS. 5A and 5B are diagrams showing the structure of a multiplier group shown in FIG. 1.
Figure 5B:
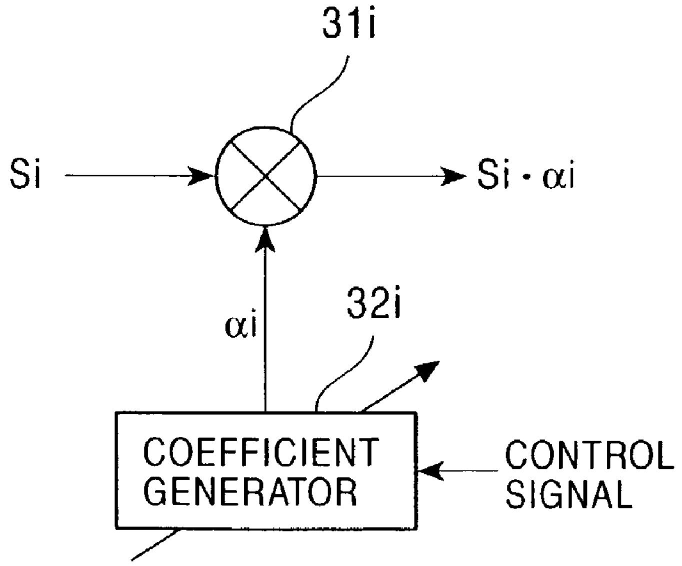

FIG. 5A shows the circuit structure of the multiplier group 25 for each band. For example, for an i-th band, the multiplier group 25 includes a multiplier 31*i* and a coefficient generator 32*i*. The multiplier 31*i* multiplies the i-th band level Si received from the band analyzer 24 by a coefficient $\alpha i$ generated by the coefficient generator 32*i*. The calculation result, i.e., $Si\cdot\alpha i$, is the estimated value of the i-th band level of the acoustic signal at the microphone 11. The coefficients $\alpha 1$ through $\alpha n$ for the bands are set to values according to the sound playback system, where n indicates an integer more than one. That is, the coefficients $\alpha 1$ through $\alpha n$ for the bands are set to desired values to obtain models of the sound playback system. If the coefficients $\alpha 1$ through $\alpha n$ are fixed, only one model of the sound playback system can be obtained. A mechanism capable of varying the coefficient $\alpha i$, as shown in FIG. 5B, is preferable for supporting a variety of sound playback systems.

The mechanism has two types of structure. In a first type, the coefficient $\alpha i$ may vary consecutively. In a second type, the coefficient $\alpha i$ may vary discretely. The first type of mechanism in which the coefficient $\alpha i$ is consecutively variable supports any type of sound playback system. On the other hand, in the second type of mechanism in which the coefficient $\alpha i$ is discretely variable, some coefficient values $\alpha i$ are stored in advance, from which an appropriate value is selected. For example, a plurality of typical models of sound playback systems are prepared, and sets of coefficients in correspondence therewith are stored in a register or the like.

Figure 6:
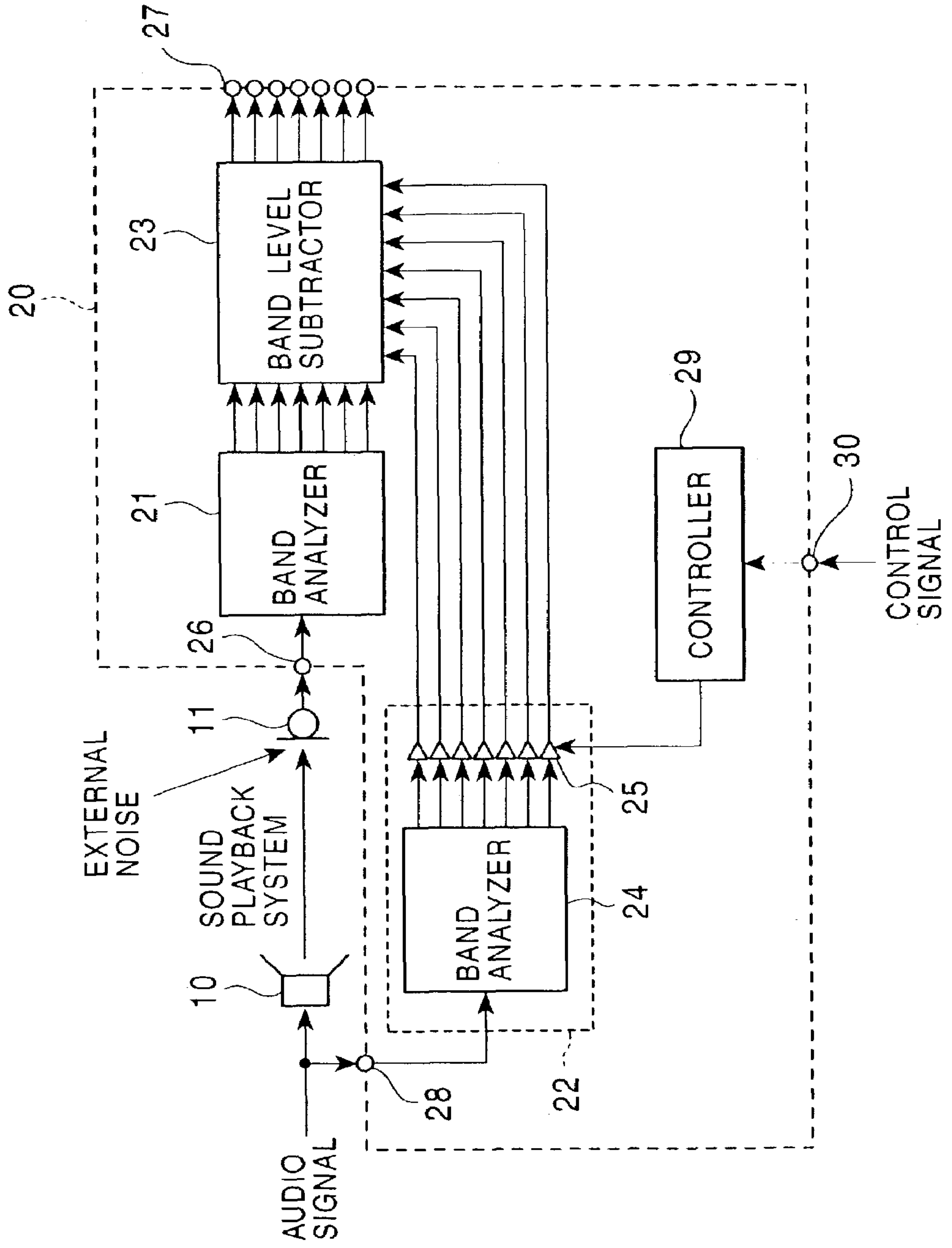
FIG. 6 is a schematic diagram of a modification of the acoustic signal processing apparatus shown in FIG. 1.

In either type, the coefficient $\alpha i$ is controlled by, for example, a controller of the acoustic signal processing apparatus 20. FIG. 6 shows the configuration of the acoustic signal processing apparatus 20 including a controller 29. When a control signal applied from the outside is received through a control terminal 30, the controller 29 controls the coefficient generator 32*i*. In the first type of mechanism, the controller 29 adjusts the coefficient value $\alpha i$ for each band in response to the control signal so that the output of the band level subtractor 23, which is obtained when an appropriate audio signal is supplied to the speaker 10, has an error within a predetermined range (for example, 2 dB, as described above with reference to FIG. 4). In the second type of mechanism, sets of discrete coefficient values are prepared, and the set of values which provides the minimum output error of the band level subtractor 23 is selected. The desired set of discrete coefficient values may be selected without calculation of the error. In this case, a signal corresponding to the set of values specified by a user is supplied to the control terminal 30, and the controller 29 selects, in response, the specified set of coefficient values. For example, coefficients are prepared in advance for car types, and the user operates an audio device (described below) so that the desired signal corresponding to the switching operation can be selected.

In the foregoing description, the band analyzers 21 and 24 perform FFT; however, any other device can be used to determine the band level for each band. For example, band-pass filters having different passbands can be used to constitute the band analyzers 21 and 24.

In the foregoing description, the widths of the bands are equal; however, the bandwidths may be different. For example, relatively broad bandwidths may be provided in the mid-low frequency range, and relatively narrow bandwidths may be provided in the high frequency range. With the bandwidths weighted in this way, the sound playback system can be more strictly modeled. However, weighting the bandwidth increases the complexity in circuit configuration and computation processing. In view of this, the equal bandwidth or weighted bandwidth may be chosen as required.

The acoustic signal processing apparatus 20 may further include, for example, a DSP (digital signal processor). The DSP is a one-chip semiconductor device having a circuit suitable for quickly repeating sum-of-product computations. As described above, since the number of required computations can be greatly reduced according to this embodiment, a compact DSP may be used, thus reducing the circuit size and the cost while achieving high speed operation and low power consumption.

Second Embodiment

Figure 7:
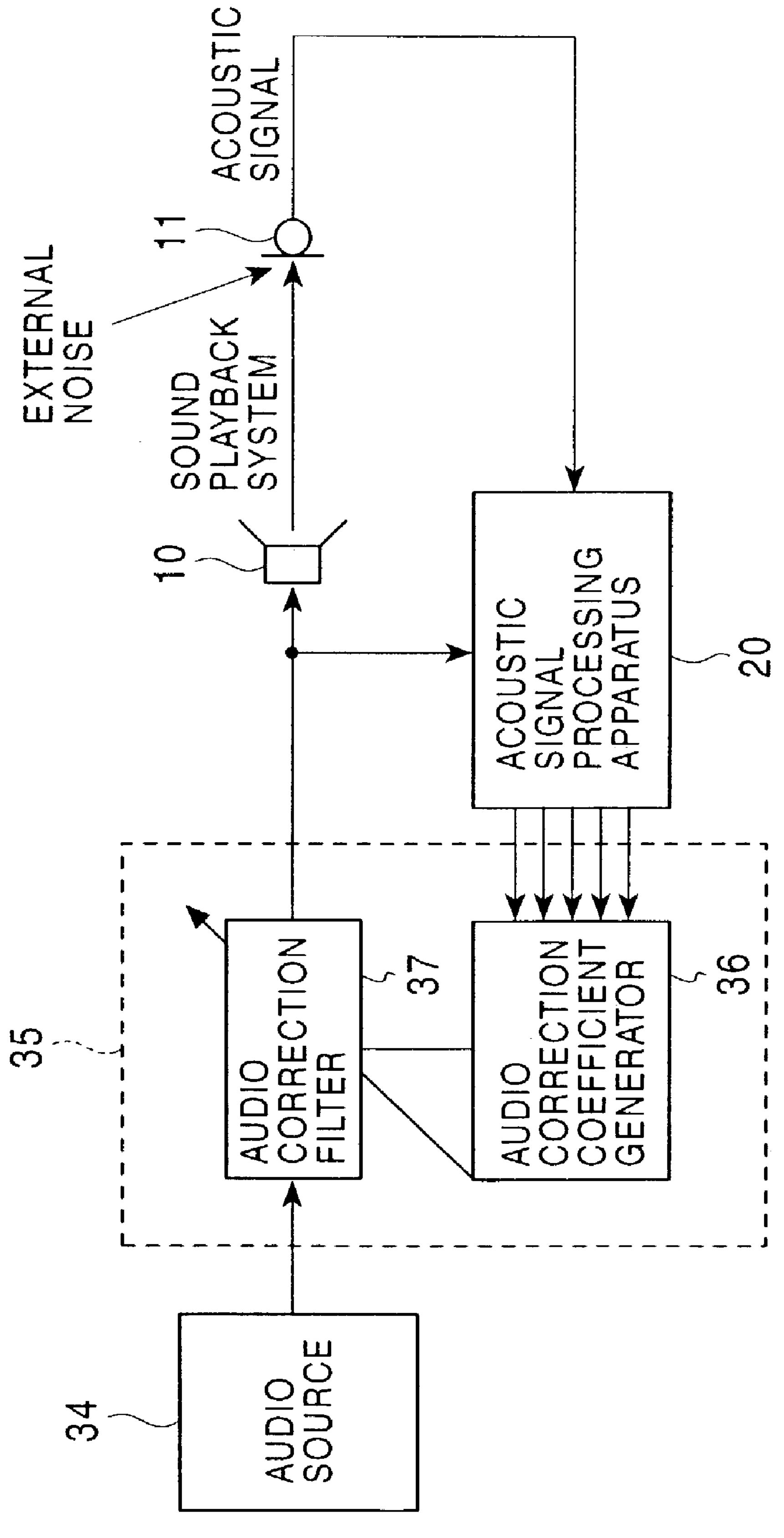
FIG. 7 is a block diagram of an audio device according to a second embodiment of the present invention.
Figure 8:
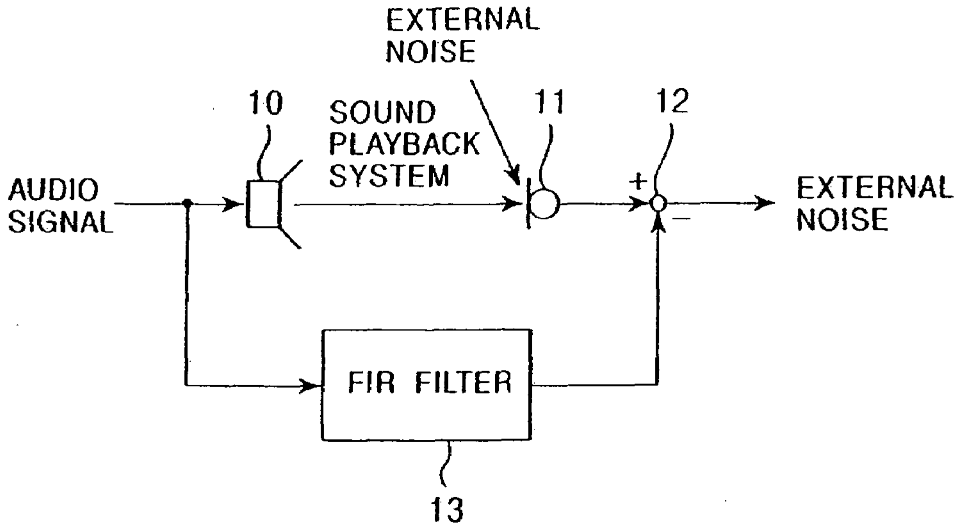
FIG. 8 PRIOR ART
FIG. 8 is a schematic diagram of an acoustic signal processing apparatus of the related art.
Figure 9:
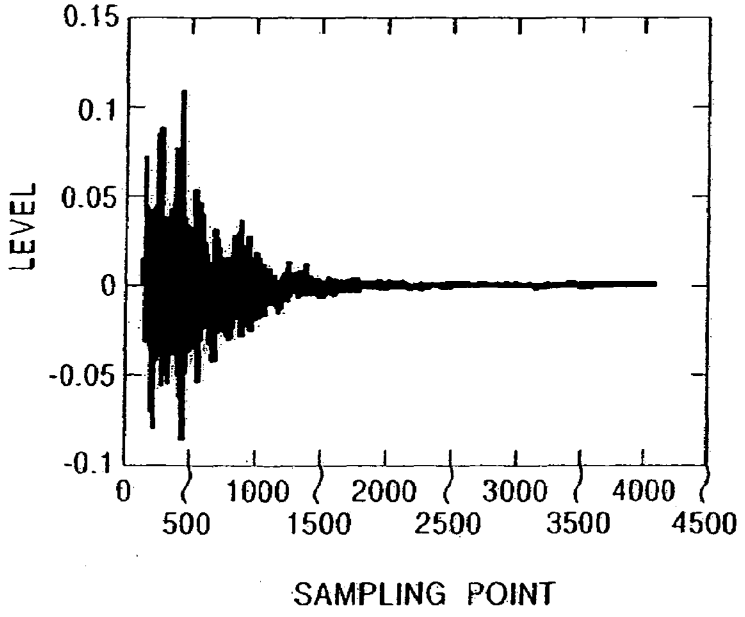
FIG. 9 is a graph showing an impulse response of a sound playback system in a car audio system.

FIG. 7 is a diagram of an audio device according to a second embodiment of the present invention. In FIG. 7, the same parts as those described above with reference to FIGS. 1 through 6 are designated by the same reference numerals.

The audio device shown in FIG. 7 includes an audio source 34, a correction unit 35, and the above-described acoustic signal processing apparatus 20. The audio source 34 reads audio information such as music from a recording medium such as a CD-ROM (compact disc read-only memory), an MD (Mini Disc), or a cassette tape for playback, and supplies an audio signal to the correction unit 35. The correction unit 35 includes an audio correction coefficient generator 36, and an audio correction filter 37. The audio correction filter 37 multiplies the audio signal by an audio correction coefficient generated by the audio correction coefficient generator 36 to perform audio correction. The audio correction coefficient generator 36 adjusts the value of the audio correction coefficient according to the output signal of the acoustic signal processing apparatus 20, i.e., the external noise signal supplied from the output terminal 27. That is, the correction unit 35 performs filtration so that the acoustic signal provided to the sound playback system through the speaker 10 contains a component for canceling the external noise. The correction unit 35, the speaker 10, the sound playback system, the microphone 11, and the acoustic signal processing apparatus 20 form a single loop, thus allowing time-varying external noise to be detected in real time to perform real-time audio correction on the audio signal supplied from the audio source 34.

In the present invention, the speaker 10 and/or the microphone 11 may be accommodated by the audio device, or may be external to the audio device.

What is claimed is:

1. An acoustic signal processing apparatus comprising:

an audio source for generating an audio signal;

an audio correction filter for receiving the audio signal and correcting the audio signal to contain a component for canceling an external noise component in a sound playback system;

a speaker for receiving the corrected audio signal and providing an acoustic signal to the sound playback system;

a first band analyzer for dividing an acoustic signal received from the sound playback system through an input unit into a plurality of frequency bands and for generating a first band level for each band;

an acoustic signal estimator for estimating the band level at the input unit of the acoustic signal provided by the speaker and for generating a second band level for each band; and a processor for extracting the external noise component, which is contained in the acoustic signal received from the sound playback system through the input unit, using the first band level and the second band level;

wherein the audio correction filter multiplies the audio signal by an audio correction coefficient generated according to the external noise component extracted by the processor.

2. An acoustic signal processing apparatus according to claim 1, wherein the acoustic signal estimator includes:

a second band analyzer for dividing an audio signal corresponding to the acoustic signal which has not been supplied to the sound playback system into the plurality of frequency bands and for generating a third band level; and a calculator for correcting the third band level according to an acoustic characteristic of the sound playback system which is in the state where the sound playback system does not have the external noise component.

3. An acoustic signal processing apparatus according to claim 1, wherein the acoustic signal estimator includes:

a second band analyzer for dividing an audio signal corresponding to the acoustic signal which has not been supplied to the sound playback system into the plurality of frequency bands and for generating a third band level; and a calculator for multiplying the third band level by a coefficient according to an acoustic characteristic of the sound playback system.

4. An acoustic signal processing apparatus according to claim 3, wherein the acoustic signal estimator further includes a coefficient adjusting unit for adjusting the value of the coefficient.

5. An acoustic signal processing apparatus according to claim 1, wherein the acoustic signal estimator selectively generates a plurality of second band levels depending upon a state of the sound playback system.

6. An acoustic signal processing apparatus according to claim 1, wherein the processor subtracts the second band level from the first band level.

7. An acoustic signal processing apparatus according to claim 1, wherein the first band analyzer, the acoustic signal estimator, and the processor are formed on a single chip.

8. An acoustic signal processing apparatus according to claim 1, wherein the band level comprises a mean level for each frequency band.

9. An audio signal processing method comprising:

receiving an audio signal;

correcting the audio signal to contain a component for canceling an external noise component in a sound playback system;

providing an acoustic signal to the sound playback system using the corrected audio signal;

dividing an acoustic signal received from the sound playback system through an input unit into a plurality of frequency bands and generating a first band level for each band;

estimating the band level at the input unit of the acoustic signal provided to the sound playback system and generating a second band level for each band; and extracting the external noise component, which is contained in the acoustic signal received from the sound playback system through the input unit, using the first band level and the second band levels;

wherein the act of correcting includes multiplying the audio signal by an audio correction coefficient based on the extracted external noise component.

10. An audio signal processing method according to claim 9, wherein the act of estimating the band level of the original acoustic signal at the input unit and generating a second band level for each band includes:

a second band analyzing act of dividing an audio signal corresponding to the acoustic signal which has not been supplied to the sound playback system into the plurality of frequency bands and generating a third band level; and correcting the third band level according to an acoustic characteristic of the sound playback system which is in the state where the sound playback system does not have the external noise component.

11. An acoustic signal processing method according to claim 9, wherein the act of estimating the band level of the acoustic signal at the input unit and generating a second band level for each band includes:

a second band analyzing act of dividing an audio signal corresponding to the acoustic signal which has not been supplied to the sound playback system into the plurality of frequency bands and outputting a third band level; and multiplying the third band level by a coefficient according to an acoustic characteristic of the sound playback system.

12. An acoustic signal processing method according to claim 11, wherein the act of estimating the band level of the acoustic signal at the input unit and generating a second band level for each band further includes an act of adjusting the value of the coefficient.

13. An acoustic signal processing apparatus according to claim 11, wherein the act of estimating the band level of the acoustic signal at the input unit and generating a second band level for each band further includes an act of selectively generating a plurality of second band levels depending upon a state of the sound playback system.

14. An audio device comprising:

an audio source for generating an audio signal;

a correction unit for receiving the audio signal and correcting the audio signal to contain a component for canceling an external noise component in a sound playback system; and a speaker for receiving the corrected audio signal and providing an acoustic signal to the sound playback system;

wherein the correction unit includes:

a first band analyzer for dividing an acoustic signal received from the sound playback system through an input unit into a plurality of frequency bands and for generating a first band level for each band;

an acoustic signal estimator for estimating the band level at the input unit of the acoustic signal provided by the speaker and for generating a second band level for each band;

a processor for extracting the external noise component, which is contained in the acoustic signal received from the sound playback system through the input unit, using the first band level and the second band level; and a corrector for correcting the audio signal by multiplying the audio signal by an audio correction coefficient generated according to the external noise component extracted by the processor.

15. An audio device according to claim 14, wherein the correction unit includes a filter for performing audio correction on the audio signal according to the external noise component.

16. An audio device according to claim 14, wherein the acoustic signal estimator includes:

a second band analyzer for dividing an audio signal corresponding to the acoustic signal which has not been supplied to the sound playback system into the plurality of frequency bands and for generating a third band level; and a calculator for correcting the third band level according to an acoustic characteristic of the sound playback system which is in the state where the sound playback system does not have the external noise component.

17. An audio device according to claim 14, wherein the acoustic signal estimator includes:

a second band analyzer for dividing an audio signal corresponding to the acoustic signal which has not been supplied to the sound playback system into the plurality of frequency bands and for generating a third band level; and a calculator for multiplying the third band level by a coefficient according to an acoustic characteristic of the sound playback system.

18. An acoustic signal processing apparatus according to claim 17, wherein the acoustic signal estimator further includes a coefficient adjusting unit for adjusting the value of the coefficient.

19. An acoustic signal processing apparatus according to claim 14, wherein the acoustic signal estimator selectively generates a plurality of second band levels depending upon a state of the sound playback system.

20. An acoustic signal processing apparatus according to claim 14, wherein the processor subtracts the second band level from the first band level.

21. An acoustic signal processing apparatus according to claim 14, wherein the band level comprises a mean level for each frequency band.

* * * * *